F. C. BROWN.
FOOD WARMER.
APPLICATION FILED APR. 2, 1910.

980,057.

Patented Dec. 27, 1910.
2 SHEETS—SHEET 1.

Witnesses
Thos. F. Knox,

Inventor
Firmin C. Brown.
By Victor J. Evans
Attorney

F. C. BROWN.
FOOD WARMER.
APPLICATION FILED APR. 2, 1910.

980,057.

Patented Dec. 27, 1910.
2 SHEETS—SHEET 2.

Witnesses
Thos. F. Knox,
C. Bradway

Inventor
Firmin C. Brown.
By Victor J. Evans
Attorney

UNITED STATES PATENT OFFICE.

FIRMIN C. BROWN, OF CHARLESTON, WEST VIRGINIA.

FOOD-WARMER.

980,757.

Specification of Letters Patent. Patented Dec. 27, 1910.

Application filed April 2, 1910. Serial No. 552,985.

*To all whom it may concern:*

Be it known that I, FIRMIN C. BROWN, a citizen of the United States, residing at Charleston, in the county of Kanawha and State of West Virginia, have invented new and useful Improvements in Food-Warmers, of which the following is a specification.

This invention relates to a warming device intended primarily for use where cooked meals are carried out from restaurants, hotels and similar places to apartments, offices, residences, and cottages at public resorts.

The invention has for one of its objects to provide an extremely simple, effective and practical device of this character which will effectively keep the food and dishes warm while being transported, which will hold a large quantity and variety of foods, and which will enable the foods to be kept in a thoroughly sanitary condition while being transported.

Another object of the invention is the provision of a portable holder for foods contained in pans or other receptacles and plates to be used at the meal, and a burner for supplying the heat for keeping the contents of the device hot.

With these objects in view, and others as will appear as the description proceeds, the invention comprises the various novel features of construction and arrangement of parts which will be more fully described hereinafter and set forth with particularity in the claims appended hereto.

Figure 1:
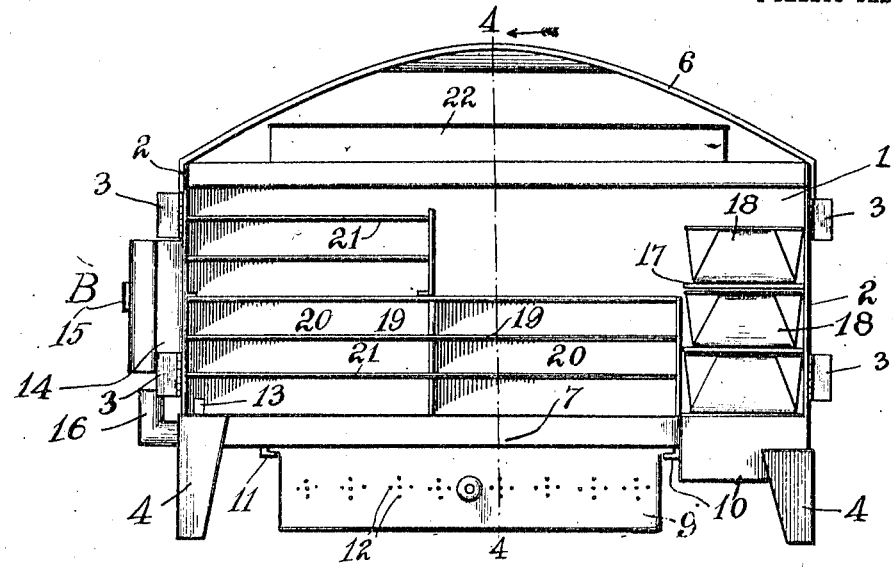
Figure 2:
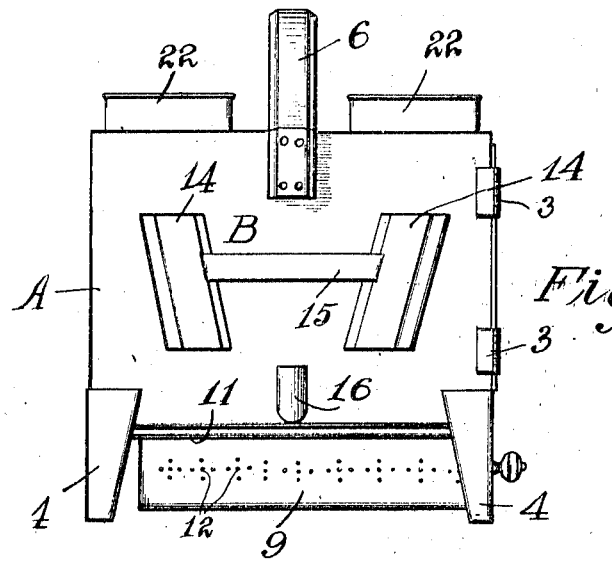
Figure 3:
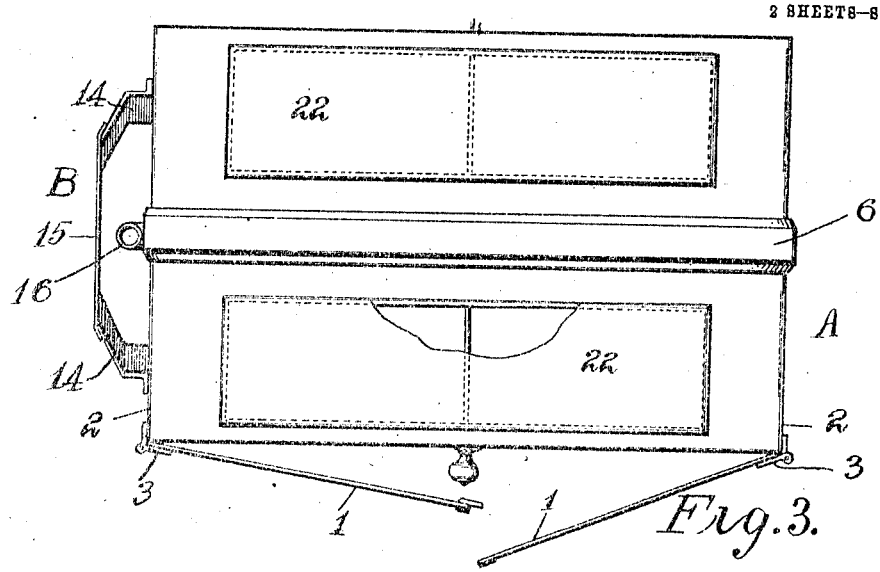
Figure 4:
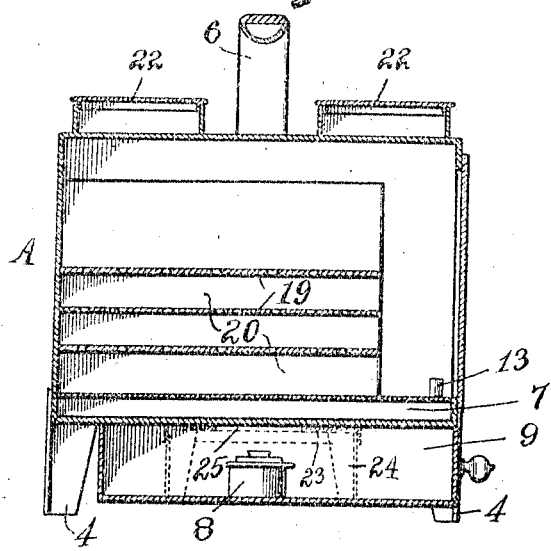
Figure 5:
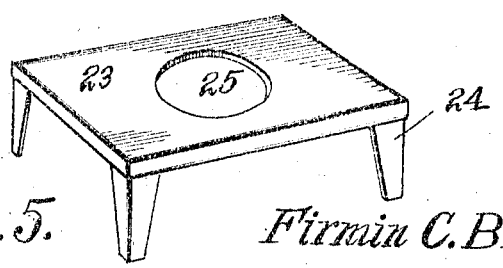

In the accompanying drawing, which illustrates one embodiment of the invention;—Figure 1 is a front view of the device with the doors removed. Fig. 2 is an end view thereof. Fig. 3 is a plan view of the food warmer. Fig. 4 is a transverse section on line 4—4 of Fig. 1. Fig. 5 is a perspective view of a detachable platform or support to be used in connection with a heater for cooking purposes.

Similar reference characters are employed to designate corresponding parts throughout the several views.

Referring to the drawing, A designates the body of the device, which is of any desired shape and size and constructed of sheet metal or any other suitable material. The body in the present instance is shown as a hollow rectangular structure closed at all sides except the front for permitting the food containing receptacles, dishes, and the like to be placed in the warmer or removed therefrom, and this open side or front of the casing can be closed by oppositely swinging doors 1, which are connected with the end walls 2 of the casing by hinges 3. The casing is provided with corner supporting legs 4, on which the device can rest, and in order to conveniently transport the device, the same is provided with a bail or handle 6. In the bottom of the casing or body A is a shallow steam generating compartment 7, which is heated by a lamp or other heating burner 8 that is arranged in a drawer 9 disposed under the casing, the legs 4 supporting the casing high enough to permit the drawer to be removed for access to the lamp. The drawer has laterally extending flanges 10 that engage in guides 11 secured on the bottom of the casing and as this drawer is open at the top, the flame from the lamp will impinge on the bottom of the water containing compartment 7 and effectively heat the same, the said drawer having openings 12 for admitting air to support combustion. Steam can enter the casing from the compartment 7 through a short tube 13 adjacent one corner of the casing at the bottom thereof.

At the outside of the compartment at one end is a plate holding rack, designated generally by B, which consists of two downwardly inclined members 14, fastened to the end of the casing and bent inwardly toward each other so as to form a pocket for receiving a number of plates. Extending from one member 14 to the other is a cross bar 15 which holds the members in fixed relation and prevents the plates from dropping laterally out of the rack. Under the rack, which is open at its bottom, is a device for keeping the plates in the rack hot, and in the present instance, this device is in the form of an elbow 16 connected with the compartment or steam chamber 7, so that the rising vapor will heat the plates.

Arranged within the casing or body A are shelves for supporting dishes and pans, the arrangement of the shelves can be varied as desired, but as herein shown, a plurality of shelves 17 are arranged in one end of the casing to support vegetable supporting pans 18, and in the remaining part of the casing are shelves 19 21 forming individual compartments 20 for holding dishes and the like, the shelves being preferably perforated so as to permit of a ready circulation of the heated air and steam. On top of the casing are shallow covered pans 22 secured in place, and these are of such size as to be convenient for holding asparagus, corn ears, and the like, the said pans being kept hot by the heated air in the casing, the bottom of the pans being contiguous with the top of the casing so that heat can be communicated to the pans and their contents.

If any of the foods delivered are not sufficiently cooked, it is possible to further cook them to suit the wishes of the patron and for this purpose the removable platform, shown in Fig. 5, may be employed. The same consists of a supporting plate 23 having legs 24, and this can be positioned over the lamp 8 and the food to be further cooked can be set on the plate 23 so that the flame from the lamp will pass through the opening 25 and heat the pan or dish containing the food to be further cooked. This detachable platform or stool shaped structure can be carried in the lamp holding drawer if desired.

From the foregoing description taken in connection with the accompanying drawings, the advantages of the construction and of the method of operation will be readily apparent to those skilled in the art to which the invention relates, and while I have described the principle of operation of the invention, together with the device which I now consider to be the best embodiment thereof, I desire to have it understood that the device shown is merely illustrative and that such changes may be made when desired as are within the scope of the claims.

What I claim as new and desire to secure by Letters Patent is:—

1. A food warmer comprising a casing, a shallow horizontal chamber formed in the bottom of the casing for containing water, means under the casing and chamber for heating the water to generate steam, separate means for respectively discharging steam into the casing and out of the same, and a dish-holding rack carried by the casing and arranged to receive steam from the latter steam-discharging means.

2. A food warmer comprising a casing, a heater for heating the contents of the casing, a rack outside of the casing for plates, and a steam generating means arranged in coöperative relation with the rack for heating the plates therein.

3. A food warmer comprising a casing, a steam generating chamber in the bottom of the casing, a heater for the chamber, a rack on the outside of the casing for holding plates, means for conducting steam from the chamber into the casing, and means for heating the plates in the rack by vapor from the chamber.

4. A food warmer comprising a casing, a steam generating chamber in the bottom of the casing, a heater for the chamber, means for conducting steam from the chamber to the casing, a plate holding rack supported on the outside of the casing and open at its bottom, and a steam outlet connected with the chamber and discharging steam into the rack for heating the plates therein.

5. A food warmer comprising a casing, a shallow steam-generating chamber extending horizontally of the casing at the bottom thereof, compartments arranged in superimposed relation over the chamber and communicating with each other, means for discharging steam from the chamber to the compartments, a heater disposed under the chamber, a plate holder disposed outside the casing, and means under the plate holder and connected with the chamber for directing steam against the plates in the holder.

In testimony whereof I affix my signature in presence of two witnesses.

FIRMIN C. BROWN.

Witnesses:
ROBERT F. LEWIS,
T. G. NUTTER.